United States Patent
Faulkner et al.

(10) Patent No.: US 10,841,324 B2
(45) Date of Patent: *Nov. 17, 2020

(54) METHOD AND SYSTEM FOR UNIQUELY IDENTIFYING A USER COMPUTER IN REAL TIME USING A PLURALITY OF PROCESSING PARAMETERS AND SERVERS

(71) Applicant: THREATMETRIX PTY LTD, Chatswood (AU)

(72) Inventors: Alisdair Faulkner, New South Wales (AU); Colin Goldie, New South Wales (AU); David Jones, New South Wales (AU)

(73) Assignee: THREATMETRIX PTY LTD, Chatswood NSW (AU)

( * ) Notice: Subject to any disclaimer, the term of this patent is extended or adjusted under 35 U.S.C. 154(b) by 1 day.

This patent is subject to a terminal disclaimer.

(21) Appl. No.: 16/145,242

(22) Filed: Sep. 28, 2018

(65) Prior Publication Data

US 2019/0044968 A1 Feb. 7, 2019

Related U.S. Application Data

(63) Continuation of application No. 15/237,385, filed on Aug. 15, 2016, now Pat. No. 10,116,677, which is a
(Continued)

(51) Int. Cl.
*H04L 29/06* (2006.01)
*G06F 15/16* (2006.01)
(Continued)

(52) U.S. Cl.
CPC ...... *H04L 63/1425* (2013.01); *H04L 63/0876* (2013.01); *H04L 63/102* (2013.01);
(Continued)

(58) Field of Classification Search
CPC .................................................. H04L 63/1425
(Continued)

(56) References Cited

U.S. PATENT DOCUMENTS 6,496,824 B1  12/2002  Wilf
6,714,970 B1   3/2004  Fiveash et al.
(Continued)

OTHER PUBLICATIONS

G. Ruffo; WALTy: A User Behavior Tailored Tool for Evaluating Web Application Performance; IEEE; pp. 1-10 (Year: 2004).*
(Continued)

*Primary Examiner* — Monjur Rahim
(74) *Attorney, Agent, or Firm* — Troutman Pepper Hamilton Sanders LLP; James E. Schutz; Mark Lehi Jones

(57) ABSTRACT

A method is provided for identifying a compromised client device from a masquerading device. The method includes capturing a plurality of attributes from a network device connecting to a web service. In a specific embodiment, each of the attributes represents a parameter, and the plurality of parameters uniquely identifying the network device from a plurality of other networks devices. The method maintains the network device substantially free from any software programs associated with the capturing of the plurality of attributes. That is, in a specific embodiment, the method does not rely on installing executable code in the network device to capture the attributes. Based on information associated with the attributes, the method can determine if the network device is compromised.

20 Claims, 9 Drawing Sheets

Related U.S. Application Data continuation of application No. 12/196,256, filed on Aug. 21, 2008, now Pat. No. 9,444,839.

(60) Provisional application No. 60/957,829, filed on Aug. 24, 2007.

(51) Int. Cl.
　　*G06F 7/04* (2006.01)
　　*H04L 29/08* (2006.01)
　　*H04L 12/26* (2006.01)
　　*H04L 12/24* (2006.01)

(52) U.S. Cl.
　　CPC ........ *H04L 63/1466* (2013.01); *H04L 63/168* (2013.01); *H04L 67/02* (2013.01); *H04L 67/146* (2013.01); *H04L 41/0853* (2013.01); *H04L 43/08* (2013.01)

(58) Field of Classification Search
　　USPC ............................................................. 726/6
　　See application file for complete search history.

(56) References Cited

U.S. PATENT DOCUMENTS

| Patent/Pub No. | Date | Inventor | Class |
|---|---|---|---|
| 7,177,917 B2 | 2/2007 | Giotta | |
| 7,398,310 B1 | 7/2008 | Kuehl et al. | |
| 7,454,790 B2 | 11/2008 | Potok | |
| 7,461,120 B1* | 12/2008 | Artz, Jr. | H04L 63/10 709/203 |
| 7,533,265 B2 | 5/2009 | Ballinger et al. | |
| 7,545,748 B1 | 6/2009 | Riddle | |
| 7,624,274 B1 | 11/2009 | Alspector et al. | |
| 7,712,134 B1* | 5/2010 | Nucci | H04L 63/145 713/172 |
| 7,908,645 B2 | 3/2011 | Varghese et al. | |
| 7,937,336 B1* | 5/2011 | Maynard-Zhang | H04L 29/1299 706/12 |
| 8,132,233 B2* | 3/2012 | Gronholm | H04L 63/105 726/3 |
| 8,141,148 B2 | 3/2012 | Thomas et al. | |
| 8,151,327 B2* | 4/2012 | Eisen | H04L 63/0876 726/5 |
| 8,176,178 B2 | 5/2012 | Thomas et al. | |
| 8,763,113 B2 | 6/2014 | Thomas et al. | |
| 8,782,783 B2 | 7/2014 | Thomas et al. | |
| 8,844,038 B2 | 9/2014 | Niemela | |
| 9,332,020 B2 | 5/2016 | Thomas et al. | |
| 9,444,835 B2 | 9/2016 | Thomas et al. | |
| 9,444,839 B1 | 9/2016 | Faulkner et al. | |
| 9,449,168 B2 | 9/2016 | Thomas et al. | |
| 2002/0066034 A1* | 5/2002 | Schlossberg | G06F 21/552 726/23 |
| 2002/0138582 A1 | 9/2002 | Chandra et al. | |
| 2003/0140068 A1 | 7/2003 | Yeung | |
| 2003/0174684 A1* | 9/2003 | Pohjanvuori | H04W 12/06 370/338 |
| 2003/0188189 A1 | 10/2003 | Desai et al. | |
| 2003/0223367 A1 | 12/2003 | Shay et al. | |
| 2004/0024867 A1* | 2/2004 | Kjellberg | H04L 29/06 709/224 |
| 2004/0047324 A1* | 3/2004 | Diener | H04L 1/1664 370/338 |
| 2004/0098610 A1* | 5/2004 | Hrastar | H04L 41/0893 726/1 |
| 2005/0015365 A1* | 1/2005 | Kavacheri | G06F 16/9577 |
| 2005/0076230 A1* | 4/2005 | Redenbaugh | H04L 63/1441 726/26 |
| 2005/0081059 A1 | 4/2005 | Bandini et al. | |
| 2005/0187935 A1 | 8/2005 | Kumar | |
| 2005/0210027 A1 | 9/2005 | Aggarwal et al. | |
| 2006/0004837 A1* | 1/2006 | Genovker | H04L 45/28 |
| 2006/0015728 A1* | 1/2006 | Ballinger | H04L 63/0428 713/172 |
| 2006/0018466 A1* | 1/2006 | Adelstein | H04L 63/1425 380/46 |
| 2006/0064619 A1* | 3/2006 | Wen | G06F 9/50 714/734 |
| 2006/0070128 A1 | 3/2006 | Heimerdinger et al. | |
| 2006/0080657 A1 | 4/2006 | Goodman | |
| 2006/0107323 A1* | 5/2006 | McLean | G06F 21/33 726/23 |
| 2006/0149708 A1 | 7/2006 | Lavine | |
| 2006/0212942 A1* | 9/2006 | Barford | H04L 63/1416 726/24 |
| 2006/0236370 A1* | 10/2006 | John | H04L 63/102 726/1 |
| 2006/0265748 A1 | 11/2006 | Potok | |
| 2006/0282660 A1* | 12/2006 | Varghese | G06Q 20/341 713/155 |
| 2007/0011744 A1* | 1/2007 | Carothers | G06F 21/55 726/24 |
| 2007/0234409 A1* | 10/2007 | Eisen | H04L 63/0876 726/6 |
| 2008/0022357 A1* | 1/2008 | Agarwal | H04L 63/20 726/1 |
| 2008/0033794 A1 | 2/2008 | Ou et al. | |
| 2008/0034424 A1* | 2/2008 | Overcash | G06F 21/55 726/22 |
| 2008/0047009 A1 | 2/2008 | Overcash et al. | |
| 2008/0066179 A1* | 3/2008 | Liu | G06F 21/562 726/24 |
| 2008/0244744 A1* | 10/2008 | Thomas | H04L 63/1408 726/23 |
| 2008/0280592 A1* | 11/2008 | McCown | H04L 63/107 455/411 |
| 2011/0131652 A1 | 6/2011 | Robinson et al. | |
| 2011/0302653 A1 | 12/2011 | Frantz et al. | |
| 2011/0305160 A1 | 12/2011 | Green et al. | |
| 2015/0007253 A1 | 1/2015 | Thomas et al. | |
| 2017/0250983 A1 | 8/2017 | Thomas et al. | |
| 2017/0251004 A1 | 8/2017 | Thomas et al. | |

OTHER PUBLICATIONS

Stone, "CenterTrack: An OP Overlay Network for Tracking DoS Floods," ITSEC.GOV, pp. 1-14, (2000).

Dickerson et al., "Fuzzy Intrusion Detection," IEEE (2001).

Ames, "Understanding Spyware: Risk and Response," IT professional, 6(5)25-29, (2004).

Alen Peacock; Typing Patterns:; A Key to User Identification; IEEE; 2004; p. 40-47.

\* cited by examiner

METHOD AND SYSTEM FOR UNIQUELY IDENTIFYING A USER COMPUTER IN REAL TIME USING A PLURALITY OF PROCESSING PARAMETERS AND SERVERS

CROSS REFERENCE TO RELATED APPLICATIONS

This application is a continuation of U.S. patent application Ser. No. 15/237,385, filed 15 Aug. 2016 and published as U.S. Patent Application Publication No. US2017/0230390 on 10 Aug. 2017, which is a continuation of U.S. patent application Ser. No. 12/196,256, filed 21 Aug. 2008 and issued as U.S. Pat. No. 9,444,839 on 13 Sep. 2016. U.S. patent application Ser. No. 12/196,256 claims priority to U.S. Provisional Application No. 60/957,829, filed 24 Aug. 2007, the contents of incorporated herein reference as if presented in full.

This application is also related to U.S. patent application Ser. No. 11/550,393 filed Oct. 17, 2006, entitled "METHOD AND SYSTEM FOR PROCESSING A STREAM OF INFORMATION FROM A COMPUTER NETWORK USING NODE BASED REPUTATION CHARACTERISTICS," U.S. patent application Ser. No. 11/550,395 filed Oct. 17, 2006, entitled "A METHOD AND SYSTEM FOR TRACKING MACHINES ON A NETWORK USING FUZZY GUID TECHNOLOGY," and U.S. patent application Ser. No. 12/022,022, filed Jan. 29, 2008, entitled, "METHOD FOR TRACKING MACHINES ON A NETWORK USING MULTIVARIABLE FINGERPRINTING OF PASSIVELY AVAILABLE INFORMATION," commonly assigned, incorporated here by reference as if presented in full.

COPYRIGHT NOTICE

All content included such as text, graphics, logos, button icons, images, audio clips, digital downloads, data compilations, and software, is the property of its supplier and protected by United States and international copyright laws. The compilation of all content is protected by U.S. and international copyright laws. Copyright © 2006 ThreatMETRIX PTY LTD. All rights reserved.

BACKGROUND OF THE INVENTION

The present invention generally relates to network and network host monitoring techniques. More particularly, the invention provides a method and system for uniquely identifying a user computer for security violations in real time using a plurality of processing parameters and logic.

Telecommunication techniques have been around for numerous years. In the 1990s, another significant development in the telecommunication industry occurred. People began communicating to each other by way of computers, which are coupled to the telephone lines or telephone network. These computers or workstations coupled to each other can transmit many types of information from one geographical location to another geographical location. This information can be in the form of voice, video, and data, which have been commonly termed as "multimedia." Information transmitted over the Internet or Internet "traffic" has increased dramatically in recent years. Information is now transmitted through networks, wide-area networks, telephone systems, and the Internet. This results in rapid transfer of information such as computer data, voice or other multimedia information.

Although the telecommunication industry has achieved major successes, certain drawbacks have also grown with wide spread communication networks. As merely an example, negative effects include an actor (initiator) connecting to another actor (acceptor) in a manner not acceptable to the acceptor. The inability for the acceptor to assess the risk of allowing connection from any initiator means there is a problem for efficient resource management and protection of assets.

As the size and speed of these networks increase, similar growth of malicious events using telecommunications techniques: stalking, cyber-stalking, harassment, hacking, spam, computer-virus outbreaks, Denial of Service attacks, extortion, fraudulent behaviors (e.g., fraudulent commerce and credit-card payments, money laundering, fraudulent websites, scams, 419 spam, so-called phishing) have also continued to increase. The goal of the malicious entity (Offender) is to inflict damage at minimum risk of detection or accountability. In the current realm of internet malicious activity, the offenders make use of anonymizing elements to achieve the latter.

Various methods have been proposed to detect compromised hosts. For example, a common method for identifying and sharing reputation about a networked device is via the IP Address. These and other conventional methods have certain limitations that are described throughout the present specification and more particularly below.

From the above, it is seen that a technique for improving security over a wide area network is highly desirable.

BRIEF SUMMARY OF THE INVENTION

The present invention generally relates to network and network host monitoring techniques. More particularly, the invention provides a method and system for uniquely identifying a user computer for security violations in real time using a plurality of processing parameters and logic. Merely by way of example, the invention has been applied to a computer network environment. But it would be recognized that the invention has a much broader range of applicability. For example, the invention can be applied to a firewall, an intrusion detection/prevention system, a server, a content filter device, an anti-virus process, an anti-SPAM device, a web proxy content filter, spyware, web security process, electronic mail filter, a web or e-commerce application, a VoIP gateway or server, any combination of these, and others.

According to an embodiment of the present invention, a method is provided for identifying a compromised client device from a masquerading device. The method includes capturing a plurality of attributes from a network device connecting to a web service. In a specific embodiment, each of the attributes represents a parameter, and the plurality of parameters uniquely identifying the network device from a plurality of other networks devices. The method maintains the network device substantially free from any software programs associated with the capturing of the plurality of attributes. That is, in a specific embodiment, the method does not rely on installing executable code in the network device to capture the attributes. Based on information associated with the attributes, the method can determine if the network device is compromised.

In a specific embodiment, the method includes using fuzzy logic to process the attributes. In an embodiment, the method determines existence and classification of a masquerading device. In some embodiments, the method also includes determining an identifier for a malicious device. In certain embodiments, the method also includes testing with a known network device.

In some embodiments of the invention, at least some of the attributes are related to one or more of ID information, network information, location information, device information, browser information, site information, or time information associated with the network device. In a specific embodiment, the ID information comprises one or more of Flash Cookie, first Party Browser Cookie, and third Party Browser Cookie. In an embodiment, the network information comprises one or more of IP Address, ISP, MTU, Connection Type, Connection Speed, Bogon Hijack Address, Static/Dynamic Address, Proxy Address, TCP Sequence Number, and other TCP header code. In an embodiment, the location information comprises one or more of country, city, latitude, and longitude. In an embodiment, the device information includes one or more of OS, Screen Resolution, Screen DPI, Start Time, Local Time, Clock-Offset, Clock-Drift, and Time Zone. In a specific embodiment, the browser information comprises one or more of Language, Browser version, Browser string, Javascript major and minor versions, Flash major and minor versions, Browser plug-ins or extensions, and Supported MIME types. In an embodiment, the site information includes one or more of domain, domain owner, session id, merchant id, URL, referrer, advertisement, ID, and campaign ID. In an embodiment, the time information includes one or more of seconds, hour, day, week, and month.

According to an alternative embodiment, the invention provides a method for identifying a network device. The method includes capturing a plurality of attributes from the network device, each of the attributes representing a parameter. The method includes maintaining the network device substantially free from any executable software programs associated with the capturing of the plurality of attributes. The method also forms a device identifier for the network device based on information related to the plurality of parameters, the identifier uniquely identifying the network device from a plurality of other networks devices.

In a specific embodiment, at least some of the attributes are related to one or more of the ID information, network information, location information, device information, browser information, site information, or time information associated with the network device. In a example, the ID information includes one or more of Flash Cookie, first Party Browser Cookie, and third Party Browser Cookie. In another example, the network information includes one or more of IP Address, ISP, MTU, Connection Type, Connection Speed, Bogon Hijack Address, Static/Dynamic Address, Proxy Address, TCP Sequence Number, and other TCP header code. In yet another example, the location information includes one or more of country, city, latitude, and longitude.

In an embodiment of the method, the attributes may be related to certain other information associated with the network device. For example, the site information may include one or more of domain, domain owner, session id, merchant id, URL, referrer, advertisement, ID, and campaign ID. In another embodiment, the time information includes one or more of seconds, hour, day, week, and month. In an example, the device information includes one or more of OS, Screen Res, Screen DPI, Start Time, Local Time, Clock-Drift, and Time Zone. In a specific example, the browser information includes one or more of Language, Browser version, Browser string, Javascript major and minor versions, Flash major and minor versions, Browser plug-ins or extensions, and Supported MIME types.

In an embodiment of the method, the device identifier is based on an associated set of measured attributes. In a specific embodiment, the measured attributes are free from personably identifiable information. In an embodiment, the formation of the device identifier is substantially independent of a quality associated with the measured attributes, the quality being related to persistence, uniqueness, accuracy, coverage, speed, or integrity of the measured attributes. In an embodiment, the device identifier is formed based on information related to a subset of the plurality of parameters.

In an embodiment, forming the device identifier over repeat measurements is substantially independent with respect to variations in the quality of attributes measured, variations in the number of attributes able to be measured, variations in the accuracy of attributes measured, and variation in the device's attribute values due to changing device characteristics. In another embodiment, the time-period required to measure the necessary device attributes is sufficiently small to enable it to be completed prior or during a transaction performed online.

In a specific embodiment, the method also includes determining one or more of the following, based on information associated with the attributes:
  a. if a device is connecting through an intermediate server,
  b. if a connection has been hijacked,
  c. if a device has a profile inconsistent with a normal internet browser,
  d. if a device demonstrates anomalous on-site behavior,
  e. if a device profile is consistent with that of a machine attempting to evade identification or detection,
  f. if a device is potentially infected, and
  g. if a device is attempting an action that may be construed as an attack on the visited website.

In some embodiments, the device identifier can be shared globally within a network of organizations without sharing private information. In certain embodiments, the device identifier is capable of being used to accumulate aggregated and correlated information about the device's reputation, where reputation includes behavior or activity of both a positive or negative nature. In a specific embodiment, the device identifier or its associated attributes and reputation is used to cause an action to be triggered based on a match with a pre-defined rule. In an embodiment, the forming of the identifier is based on a matching logic. In an embodiment, the matching logic is implemented on one or more servers. In a specific embodiment, the matching logic is executed on local or remote servers. In some embodiments, additional transactions per second can be supported by adding more servers. In an embodiment, the matching logic is executed in parallel or in series. In certain embodiments, the matching logic is added and removed without compromising previously generated device identifiers. In an embodiment, execution of matching logic is avoided if it is redundant. In some embodiments, changes to matching logic do not require changes to hardware or software code. In an embodiment, the matching logic includes self-learning for optimizing performance and accuracy over time. In some embodiments, the matching logic is based on one or more of priority, equality, score, weighting, classification, or range associated with a rule. In an embodiment, the matching logic includes matching rules that are based on a combination of measured device attributes. In certain embodiments, the matching logic includes matching rules that are grouped by priority, matching logic, or attributes.

In another specific embodiment, the method also includes updating attributes associated with the device, wherein if an existing attribute set for a device identifier is compared against a returning device's attribute and a match is found, then the existing attribute set is updated with the more recent attribute set. In an embodiment, the attributes and match identifier are provided by a web-service. In a specific embodiment, device identifiers provided by two separate web-services for the network device are substantially identical.

According to yet another embodiment, the invention provides a system for uniquely identifying a network device associated with a web service. The system includes a measurement server for measuring, collating, and classifying a plurality of attributes associated with the network device connecting to the web service. In an embodiment, the plurality of attributes uniquely identify the network device from a plurality of other networks devices. The system includes a fingerprint server for receiving the plurality of attributes from the measurement server and generating a unique identifier for the network device. The system also includes an application server for receiving a verification request from the web service. The request is associated with the network device. In an embodiment, the application server processes the request in communication with the fingerprint server and receives the unique identifier from the fingerprint server. In a specific embodiment, the fingerprint server includes a rule engine which uses a rule group based strategy. In another embodiment, the fingerprint server comprises a rule engine distributed fingerprint repository, and a reputation engine.

Various additional objects, features, and advantages of the present invention can be more fully appreciated with reference to the detailed description and accompanying drawings that follow.

DETAILED DESCRIPTION OF THE INVENTION

Figure 1:
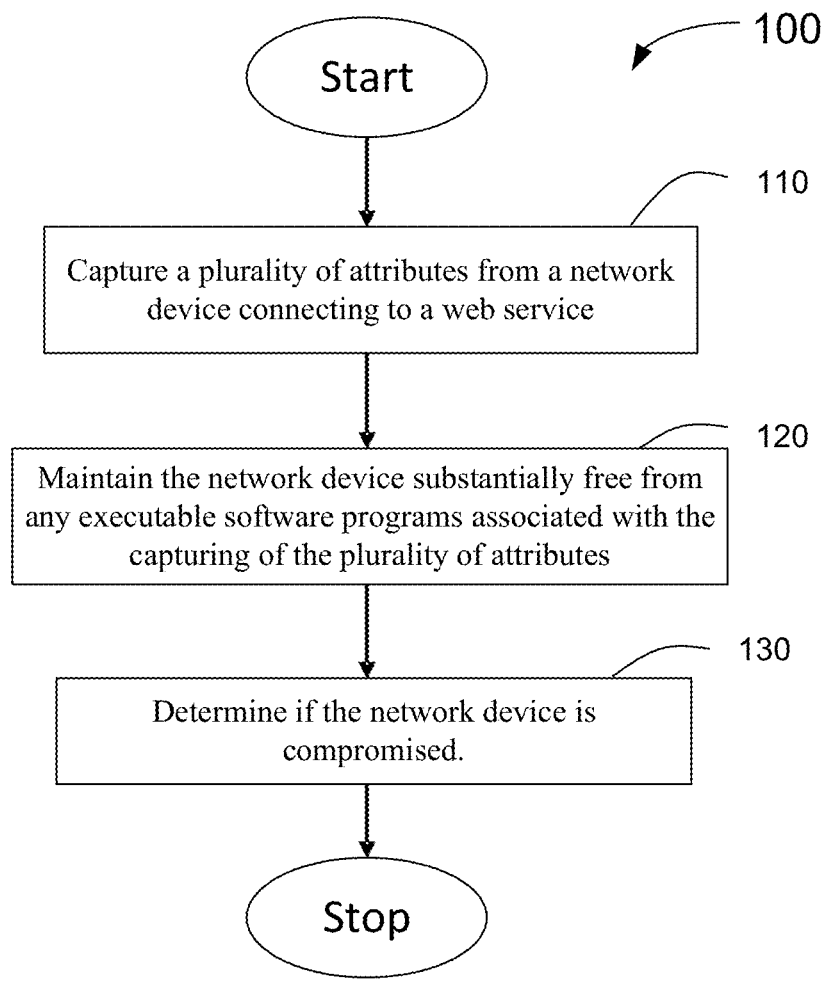
FIG. 1 is a simplified flow diagram illustrating a method for identifying a compromised client device from a masquerading device according to an embodiment of the present invention.

The present invention generally relates to network and network host monitoring techniques. More particularly, the invention provides a method and system for uniquely identifying a user computer for security violations in real time using a plurality of processing parameters and logic. Merely by way of example, the invention has been applied to a web server environment. But it would be recognized that the invention has a much broader range of applicability. For example, the invention can be applied to a firewall, an intrusion detection/prevention system, a server, a content filter device, an anti-virus process, an anti-SPAM device, a web proxy content filter, spyware, web security process, electronic mail filter, a web or e-commerce application, a VoIP gateway or server, any combination of these, and others.

A common method for identifying and sharing reputation about a networked device is via the IP Address. Examples of reputation information include:
Whether spam email was seen from the IP Address
Whether a port scan attempt was seen from the IP Address
Whether an illegal transaction was performed by the IP Address
Whether an advertisement was observed from the IP Address However, an IP Address has limitations in its ability to uniquely identify a network device with certainty and persistence that is described in greater detail.

In an embodiment, the invention provides a clientless method of obtaining and blending known and proprietary attributes of an internet device in order to produce a network-identifier independent globally unique identifier for the purpose of collating and correlating reputation of the device across web properties and organizations.

Techniques for identifying an internet connected device using client-side installed software are well known. This executable software is either installed on the target computers operating or through code executed within a browse e.g. ActiveX. Examples of identifiers obtained include MAC Address, Hard Drive serial number or an application identifier that is uniquely generated during installation.

One limitation of such approaches is that they require permission or action by the owner of the operating system or the browser before they can be installed or used. If this is a requirement of performing a transaction on a website, such as purchasing a product online, then it is understood that the user's experience can be adversely affected and may, for example, choose to not complete the transaction due to the inconvenience involved.

Another limitation is that organizations using this technique become responsible for supporting software on an end user's machine. For many organizations, the support costs involved in training of end users for installation and troubleshooting mean that such an approach is not practical.

Yet another limitation is that if the target machine is compromised by malicious code, then the identification process itself can potentially be forged or compromised.

Instead, approaches for identifying a return visitor through clientless methods have been explored as a means to overcome the disadvantages of installed hardware or software in order to identify a return visitor. Many such methods are well known and have been used extensively in the advertising industry and banking industry since the inception of ecommerce. For example first and third-party browser cookies, IP Address and the browser agent string that are available through Common Gateway Interface (CGI) parameters. Such techniques have also been employed for applications such as internet banking. However, each identification technique on its own or in combination has limitations in its quality namely how unique, persistent, accurate, ubiquitous, convenient and quick it is to measure and match with. Also, the problem of return visitor identification for a website is a smaller subset of the issue of generating a globally unique and persistent identifier that can be shared across all websites.

With respect to the device's IP Address, while it does provide some value as a global identifier, it still suffers from a number of practical disadvantages. One such limitation is that IP Address ranges allocated by ISPs to an organization or user may be recycled periodically. Such dynamically allocated IP Addresses are common for dial-up modems, but may apply for any internet connection depending on the ISPs address allocation policy. Another limitation that is common for corporations is that all devices connecting to the internets will be from behind a single Network Address Translated (NAT'ed) IP Address. Therefore, a reputation based on IP Addresses will taint all devices with the same IP Address. Yet another limitation is the prevalent use of intermediate servers, often termed proxy servers, that may mask a device's end IP Address. In this instance a device's TCP connection is terminated on the intermediate server, and another is opened between that server and the website. These intermediate servers may be used for legitimate reasons such as the caching servers deployed by an ISP or enterprise to increase performance. However, in the case of fraud, intermediate servers known as 'anonymizing proxies' or 'open relays' are used explicitly for the purpose of hiding the end device's details.

With respect to browser cookies, a user may simply reject the use of cookies through standard browser settings. Or, they may delete cookies on a regular basis. For example, it is well known that many web browsers allow for cookies to be automatically cleared whenever the browser is closed. It is also known that cookies are typically generated based on a pseudo random number generator that may in practice overlap with other cookies generated by another web server.

With respect to the use of browser information, such as the Browser Agent String, a user may simply change browsers in order to evade detection. More sophisticated users, those with the motivation and skill to hide their identity, know that browser string information may simply be changed in the HTTP protocol or prior before it is transmitted to the server. A second issue with browser information is that it does not sufficient to uniquely identify a user. Many machines share the exact same browser information. It is true that it may be used as a parameter to filter, but the fact that it is easily forged by a motivated person reduces its effectiveness.

An extension of using browser information is other system configuration information that can be measured or derived remotely. Such system configuration may include browser plugins and versions. Examples would include screen-resolution and timezone and the presence and java, flash and javascript objects and their versions. Such extensions may add additional entropy for device identification; however they also reduce in value as a match characteristic over time as many of these elements, such as major and minor version numbers, are updated and upgraded continually by the user or via automatic update.

Time-based techniques for the purposes of attempting to identify a remote device are also known. This includes both the measurement of the clock-offset between a remote device and a server as well as attempts to measure the 'clock skew'—the amount the remote device's machine looses or gains time per unit of time.

The measurement of clock-offset can be done using numerous techniques, including active measurement using a client-side scripting language or via protocol profiling techniques. As a fingerprint technique for uniquely identifying the hundreds of millions of computers on the internet it has several severe limitations.

One such limitation being that a user or malicious software program is free to change and update their system time at will.

Another limitation is that millions of machines in the same time zone, such as New York city, will share the same local time within seconds of each other. While it is true that clock-offset may be measured with per millisecond accuracy with Javascript, its practical accuracy and viability as a matching mechanism is limited by the fact that the accuracy of measuring the time difference is dependent on the random delay, or jitter, incurred between the measurement of the clients time and when it is reported back to the measuring server. For example, the time on the remote device is measured to be 10 hours, 15 minutes, 10 seconds and 13 milliseconds. This time is then transmitted back to the server. Depending on the speed of the internet connection, congestion on the public internet and the distance between the two machines, the amount of time it takes to travel back to the server may be anywhere from a couple of seconds to several hundred milliseconds. Therefore, at the measurement server, one is uncertain of how long in the past the measurement was taken. Therefore, the amount of precision available for differentiating between computers on the same time zone is very limited.

Yet another limitation for use of clock-offset as a globally unique identifier is that different measurement servers will return a different clock offset value for the same machine depending upon where that machine is relative to the location and connection speed of the measurement server.

Another limitation is that the time measured between two machines will be different based upon the random clock-drift introduced by the inaccuracy of a PC's timing mechanism. That is to say, even with complete accuracy and precision of measurement, the clock-offset between two machines is not constant and will grow (or decrease) over time.

Ways of measuring a CPU's clock-drift as a means to differentiate between PCs behind a shared IP Address have been published. In practical terms the usage of clock-skew as a practical fingerprinting method is limited by the fact that:

1) clock-skew has been shown to change based on the load and hence heat placed on the CPU;
2) the number of machines that can be distinguished is inversely proportional to the error in clock measurement and proportional to the amount of time of which the clock drift is being measured. In practical scenarios, such as measuring a fingerprint during an internet transaction, this means only 10-100 unique identifiers are available.

Combining non-personal identifying attributes with personal identifying attributes in order to improve the uniqueness of a match is also problematic based on the fact that user details change for example the login name, or may be forged and that sharing of personal information as part of the match criteria between organizations may be competitively undesirable or legally impossible without explicit consent. Another limitation of using personal identifying data is that obtaining customer identifying data requires additional costs and diligence for managing that data imposed by some country regulations. In addition, for many applications, such as identifying click-fraud, there is no explicit relationship between the user and the website.

Yet another limitation of existing naïve methods of generating a device identifier is the way it is generated. Typically, the strategy of taking a set of attributes and generating a hash based on these attributes is problematic in that this method will not yield a match if any attribute, however minor, changes over time. A separate but related approach is to use the entirety of attribute values measured as the unique identifier in itself. The limitation of this approach is that this forces every application to have knowledge of matching logic and how to interpret the various matching qualities of these attributes. This is even more problematic if new logic and new rules are added overtime.

Yet another key limitation of existing methods of generating a device identifier is that they may be performed without taking into account of the underlying integrity of the measurement process itself. An example being when an intermediate server is situated between the client device and the website, incorrect selection of attributes measured and matching strategies will inadvertently result in blending characteristics from the intermediate server and the client.

Accordingly, there is a need for improved techniques for generating device identifiers via web services.

FIG. 1 is a simplified flow diagram illustrating a method 100 for identifying a compromised client device from a masquerading device according to an embodiment of the present invention. The method includes the following processes:

1. (Process 110) Capture a plurality of attributes from a network device connecting to a web service;
2. (Process 120) Maintain the network device substantially free from any software programs associated with the capturing of the plurality of attributes; and
3. (Process 130) Determine if the network device is compromised.

According to an embodiment of the present invention, the method is provided for identifying a compromised client device from a masquerading device includes capturing a plurality of attributes from a network device connecting to a web service. In a specific embodiment, each of the attributes represents a parameter, and the plurality of parameters uniquely identifying the network device from a plurality of other networks devices. The method maintains the network device substantially free from any software programs associated with the capturing of the plurality of attributes. That is, in a specific embodiment, the method does not rely on installing executable code in the network device to capture the attributes. Based on information associated with the attributes, the method can determine if the network device is compromised.

In a specific embodiment, each of the attributes represents a parameter, and the plurality of parameters uniquely identifying the network device from a plurality of other networks devices. The method maintains the network device substantially free from any software programs associated with the capturing of the plurality of attributes. That is, in a specific embodiment, the method does not rely on installing executable code in the network device to capture the attributes. Based on information associated with the attributes, the method can determine if the network device is compromised.

In a specific embodiment, the method includes using fuzzy logic to process the attributes. In an embodiment, the method determines existence and classification of a masquerading device. In some embodiments, the method also includes determining an identifier for a malicious device. In certain embodiments, the method also includes testing with a known network device.

In some embodiments of the invention, at least some of the attributes are related to one or more of ID information, network information, location information, device information, browser information, site information, or time information associated with the network device. In a specific embodiment, the ID information comprises one or more of Flash Cookie, first Party Browser Cookie, and third Party Browser Cookie. In an embodiment, the network information comprises one or more of IP Address, ISP, MTU, Connection Type, Connection Speed, Bogon Hijack Address, Static/Dynamic Address, Proxy Address, TCP Sequence Number, and other TCP header code. In an embodiment, the the location information comprises one or more of country, city, latitude, and longitude. In an embodiment, the device information includes one or more of OS, Screen Resolution, Screen DPI, Start Time, Local Time, Clock-Offset, Clock-Drift, and Time Zone. In a specific embodiment, the browser information comprises one or more of Language, Browser version, Browser string, Javascript major and minor versions, Flash major and minor versions, Browser plug-ins or extensions, and Supported MIME types. In an embodiment, the site information includes one or more of domain, domain owner, session id, merchant id, URL, referrer, advertisement, ID, and campaign ID. In an embodiment, the time information includes one or more of seconds, hour, day, week, and month.

According to an alternative embodiment, the invention provides a method for identifying a network device. The method includes the following processes:

1. Capture a plurality of attributes from the network device, each of the attributes representing a parameter.
2. Maintain the network device substantially free from any executable software programs associated with the capturing of the plurality of attributes; and
3. Form a device identifier for the network device based on information related to the plurality of parameters, the identifier uniquely identifying the network device from a plurality of other networks devices.

In a specific embodiment, at least some of the attributes are related to one or more of the ID information, network information, location information, device information, browser information, site information, or time information associated with the network device. In a example, the ID information includes one or more of Flash Cookie, first Party Browser Cookie, and third Party Browser Cookie. In another example, the network information includes one or more of IP Address, ISP, MTU, Connection Type, Connection Speed, Bogon Hijack Address, Static/Dynamic Address, Proxy Address, TCP Sequence Number, and other TCP header code. In yet another example, the location information includes one or more of country, city, latitude, and longitude.

In an embodiment of the method, the attributes may be related to certain other information associated with the network device. For example, the site information may include one or more of domain, domain owner, session id, merchant id, URL, referrer, advertisement, ID, and campaign ID. In another embodiment, the time information includes one or more of seconds, hour, day, week, and month. In an example, the device information includes one or more of OS, Screen Res, Screen DPI, Start Time, Local Time, Clock-Drift, and Time Zone. In a specific example, the browser information includes one or more of Language, Browser version, Browser string, Javascript major and minor versions, Flash major and minor versions, Browser plug-ins or extensions, and Supported MIME types.

In an embodiment of the method, the device identifier is based on an associated set of measured attributes. In a specific embodiment, the measured attributes are free from personally identifiable information. In an embodiment, the formation of the device identifier is substantially independent of a quality associated with the measured attributes, the quality being related to persistence, uniqueness, accuracy, coverage, speed, or integrity of the measured attributes. In an embodiment, the device identifier is formed based on information related to a subset of the plurality of parameters.

In an embodiment, forming the device identifier over repeat measurements is substantially independent with respect to variations in the quality of attributes measured, variations in the number of attributes able to be measured, variations in the accuracy of attributes measured, variation in the device's attribute values due to changing device characteristics. In another embodiment, the time-period required to measure the necessary device attributes is sufficiently small to enable it to be completed prior or during a transaction performed online.

In a specific embodiment, the method also includes determining one or more of the following, based on information associated with the attributes:
 a. if a device is connecting through an intermediate server,
 b. if a connection has been hijacked,
 c. if a device has a profile inconsistent with a normal internet browser,
 d. if a device demonstrates anomalous on-site behavior,
 e. if a device profile is consistent with that of a machine attempting to evade identification or detection,
 f. if a device is potentially infected, and
 g. if a device is attempting an action that may be construed as an attack on the visited web site.

In some embodiments, the device identifier can be shared globally within a network of organizations without sharing private information. In certain embodiments, the device identifier is capable of being used to accumulate aggregated and correlated information about the device's reputation, where reputation includes behavior or activity of both a positive or negative nature. In a specific embodiment, the device identifier or its associated attributes and reputation is used to cause an action to be triggered based on a match with a pre-defined rule. In an embodiment, the forming of the identifier is based on a matching logic. In an embodiment, the matching logic is implemented on one or more servers. In a specific embodiment, the matching logic is executed on local or remote servers. In some embodiments, additional transactions per second can be supported by adding more servers. In an embodiment, the matching logic is executed in parallel or in series. In certain embodiments, the matching logic is added and removed without compromising previously generated device identifiers. In an embodiment, execution of matching logic is avoided if it is redundant. In some embodiments, changes to matching logic do not require changes to hardware or software code. In an embodiment, the matching logic includes self-learning for optimizing performance and accuracy over time. In some embodiments, the matching logic is based on one or more of priority, equality, score, weighting, classification, or range associated with a rule. In an embodiment, the matching logic includes matching rules that are based on a combination of measured device attributes. In certain embodiments, the matching logic includes matching rules that are grouped by priority, matching logic, or attributes.

In another specific embodiment, the method also includes updating attributes associated with the device, wherein if an existing attribute set for a device identifier is compared against a returning device's attribute and a match is found, then the existing attribute set is updated with the more recent attribute set. In an embodiment, the attributes and match identifier are provided by a web-service. In a specific embodiment, device identifiers provided by two separate web-services for the network device are substantially identical.

The above sequence of processes provides method and system for uniquely identifying a user computer for security violations in real time using a plurality of processing parameters and logic. As shown, the method uses a combination of processes including a way of capturing a plurality of attributes from a network device connecting to a web service and maintaining the network device substantially free from any software programs associated with the capturing of the plurality of attributes. This specific method is well suited to long running sessions where TCP session initiation is a small fraction of the overall communication volume. Other alternatives can also be provided where processes are added, one or more processes are removed, or one or more processes are provided in a different sequence without departing from the scope of the claims herein. Further details of the present method can be found throughout the present specification and more particularly below.

In an embodiment, the invention provides a method for the centralized generation and retrieval and match of a device's identity via web services. In preference, the web service is a call to a computing facility during a transaction that is external to the web hosting facility such that a global identifier can be generated in real time across all participating websites. Another embodiment of the invention provides a method for the generation of a local identifier from within the web hosting facility in the first instance that can be matched with a global identifier at a later time. This second option is a requirement where the owners of the website want to have complete control over the flow of information transacted with a customer for the management of uptime and user perceptions.

According to yet another embodiment, the invention provides a system for uniquely identifying a network device associated with a web service. The system includes a measurement server for measuring, collating, and classifying a plurality of attributes associated with the network device connecting to the web service. In an embodiment, the plurality of attributes uniquely identifying the network device from a plurality of other networks devices. The system includes a fingerprint server for receiving the plurality of attributes from the measurement server and generating a unique identifier for the network device. The system also includes an application server for receiving a verification request from the web service. The request is associated with the network device. In an embodiment, the application server processes the request in communication with the matching server and receives the unique identifier from the matching server. In a specific embodiment, the fingerprint server comprises a rule engine which uses a rule group based strategy. In another embodiment, the fingerprint server comprises a rule engine distributed fingerprint repository, and a reputation engine. More details about the embodiments of the invention are presented below.

In a specific embodiment, the invention includes a measurement architecture, a matching architecture and an application interface architecture. In this paper, the matching architecture is also referred to as a fingerprint architecture.

Figure 2:
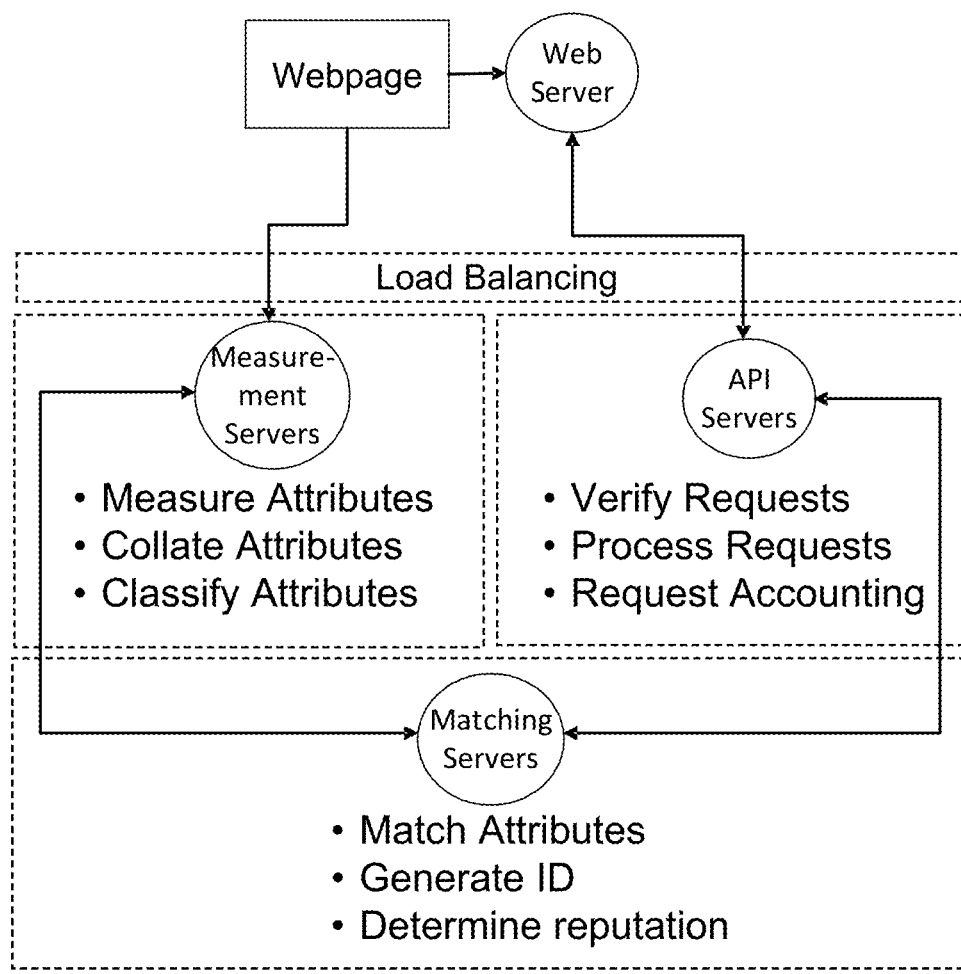
FIG. 2 is a simplified view diagram illustrating a high level functional overview of a system according to an embodiment of the present invention.

FIG. 2 is a simplified view diagram illustrating a high level functional overview of a system according to an embodiment of the present invention. Measurement servers collect measured and derived attributes for a device connecting to a web page. Each measurement with done with respect to a unique handle that is constructed in such a way that an organization can then query for the device's identifier and traits in a secure manner using a web service API. This diagram is merely an example, which should not unduly limit the scope of the claims herein. One of ordinary skill in the art would recognize other variations, modifications, and alternatives.

Figure 3:
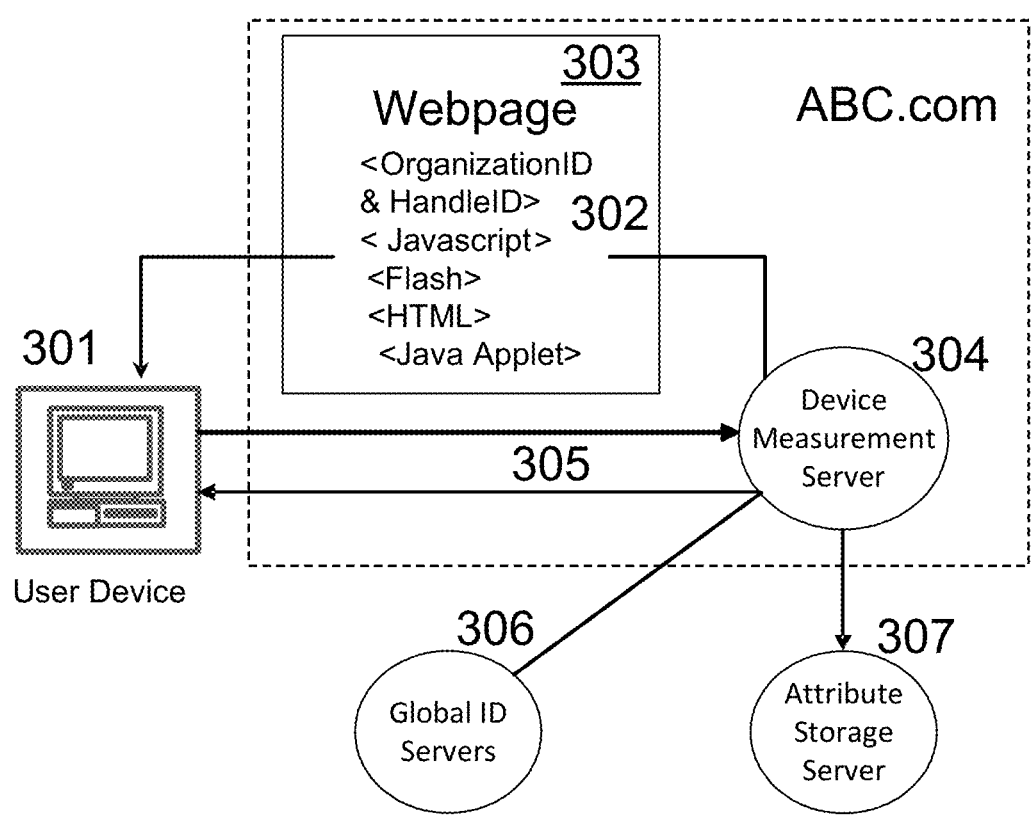
FIG. 3 is a simplified view diagram illustrating the measurement process and the allocation of a temporary identifier.

FIG. 3 is a simplified view diagram illustrating key aspects of the measurement process. A measurement of a device's attributes is performed by an involuntary user action such as the loading of a webpage 303. In preference, measurement is triggered via web code inserts 302, including javascript, flash, HTML (image) and java applet into a webpage 303 which then causes measurements to be made between the user's network device and a measurement server. This measurement server 304 may be hosted on the same domain as the web-page, or alternatively hosted by an external data center. A key advantage of the present invention is the ability to enable a third party organization to host a measurement server as part of its own web infrastructure, and specifically under the same domain e.g. ABC.com, whilst still being able to generate a globally unique device identifier. Referencing an external domain in embedded code may alert a potential fraudster or alarm a user. The measurement device then proceeds to perform measurement of device parameters using multiple measurement methods instantiated by the flash, javascript, java applet and HTML 305. 305 will also detect if temporary files, such as browser or flash cookies, have been previously set on the device 301 and fetch new cookies from a centralized server 306 in a manner that is transparent to 301. The setting of these files is such that attributes of the measured device can be encoded in the cookie for later anomaly detection. Further, multiple servers can be used to fulfill the function of 306, each using a separate name space for file allocation, to make this function scaleable. Device attributes are sent to a global attribute storage server 307 through a secure channel as they are measured. Based on the design of the present system, these device attributes may be cached or stored locally before being forwarded on and used by an organization to generate a local identifier.

The attributes detected about the device may include measurements made in band within the connection, that is to say within the TCP connection, or may alternatively trigger an out of band measurement process such as a port scan or other known technique that does not rely on the HTTP protocol.

The information collected may include both well known and proprietary attributes. An example of a non-proprietary attribute would be the collection of CGI parameters. An example of a proprietary attribute is the measurement of the device's uptime. Measurement of the device's uptime is done by exploiting the TCP timestamp option RFC 1323. When used, each endpoint of the TCP connection sends its current timestamp counter value to the other, along with the timestamp of the received packet that is being responded to. The timestamp counter is a single integer counter on the machine which is used for all TCP communication on that machine, and which is monotonically increased at a static rate determined by the operating system. For most machines, the counter is set to 0 on boot. Measurement includes 1) A routine that intercepts properly selected TCP packets and adds the timestamp option to the packet before it is sent to the client 2) A "tarpit" CGI script which, along with other fingerprint-related tasks, makes use of the characteristics of the TCP protocol to cause the client to send multiple TCP packets, evenly spaced over a period of a few seconds, to provide enough timestamp data 3) A routine that regularly monitors TCP packets, extracts and analyses timestamp data to determine the operating system and estimated start or 'up' time. The advantage of using the device's uptime is that it can be measured transparently without requiring the execution of javascript and flash, and remains persistent even if the system time on the device is changed by the user. For the purposes of matching, secondary attributes may also be derived from first-hand measured attributes. An example would be to derive whether the IP Address is statically or dynamically allocated by an ISP using a separate database of IP to attribute mappings. Examples of attributes used in part or in combination by embodiments of the invention are found in the table below.

| ID | Network | Location | Device | Browser | Site | Time |
|---|---|---|---|---|---|---|
| Flash Cookie, First Party Browser Cookie, Second Party Browser Cookie | IP Address, ISP, MTU, Connection Type, Connection Speed, Bogon Hijack Address, Static/Dynamic Address, Proxy Address, TCP Sequence Number, TCP TOS code | Country City Latitude, Longitude | OS Screen Res Screen DPI Start Time Local Time Clock-Dirt Time Zone | Language, Browser version, Browser string, Javascript major and minor versions Flash major and minor versions, Supported MIME types | Domain, Domain Owner, Session ID Merchant ID, URL, Referrer, Advertisement ID, Campaign ID, | Seconds Hour Day Week Month |

It is important that measurement of attributes be both fault tolerant and be performed in the shortest possible time. Therefore, the implementation of the measurement process is optimized to allow acquisitions of attributes in parallel where possible, and to remove the dependence of measurement from one attribute on another in case the said attribute is not available for measurement. Additionally, where possible a given attribute is measured through multiple methods to increase redundancy. For example, the screen resolution of a device is measured through flash and javascript to allow collection if one or the other is not enabled on the device.

In preference, measurement of each attribute is made with reference to a unique session identifier or handle. This temporary handle that is known to the website is later used to request a global unique identifier for the device initiating that session. In one embodiment, this handle consists of an organization ID pre-assigned by the issuing company combined with a hash of a unique session identifier generated by the web server and is referenced in the javascript, flash and html software tags embedded in a web page. This handle is then used to request the unique device identifier and attributes of the connecting device.

Measurement servers may be located behind one or more load balancing devices. Load balancers may be used to:
- Direct prioritized requests to servers in the same geography as the measurement website;
- Prioritize requests to least loaded servers in the same geography;
- Detect when a new server has been added to a server pool;
- Detect when a server is down and send connections only 'live' measurement servers.

In one embodiment the measurement process is persistent between a device and a specific measurement server for the duration of the sessions. In another embodiment this persistence is not required as each attribute is labeled with a unique session identifier and the fingerprint is reconstructed without compromising the integrity of the measurement process. In preference device attributes are stored in a temporary logical queue until a match is required, meaning when requested via an API request with valid session identifier.

Figure 4:
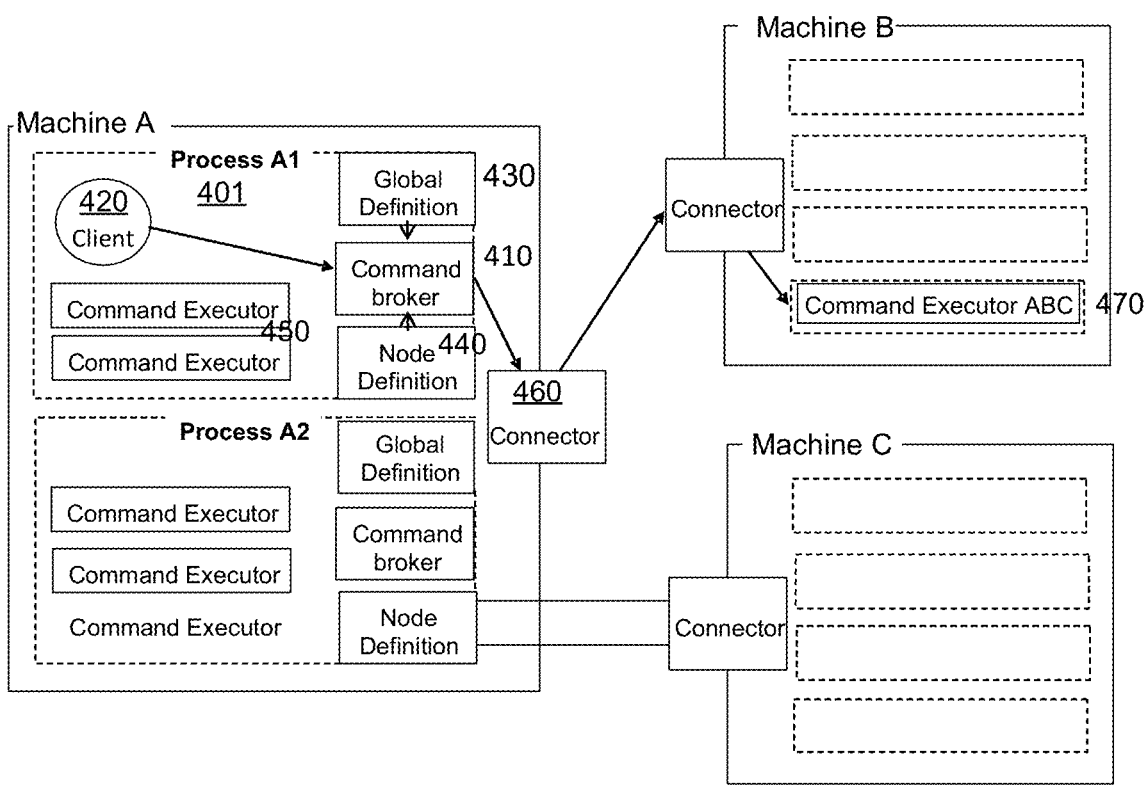
FIG. 4 is a simplified view diagram illustrating the interaction between the merchant website, the measurement server and fingerprinting server which performs the device identification and matching function according to an embodiment of the present invention.

FIG. 4 is a simplified view diagram illustrating the interaction between the merchant website, the measurement server and fingerprinting server which performs the device identification and matching function according to an embodiment of the present invention. This diagram is merely an example, which should not unduly limit the scope of the claims herein. One of ordinary skill in the art would recognize other variations, modifications, and alternatives.

An embodiment of the invention provides techniques for the detection of the integrity of the device through session anomaly detection and classification functions that feed into the downstream matching process. Classification of the device prior to matching can prevent incomplete, incorrect or falsified fingerprints to the repository. For example, knowledge that a device is behind a dynamic IP Address can mean that IP Address is known to be a poor match characteristic for this device at this time as the IP Address will change. In many cases, even if an identity match cannot be generated, the knowledge that a device may be cloaking its true location or IP Address is sufficient value in itself. In preference this first tier analysis is performed as part of the measurement process before attribute values are passed to the fingerprinting servers.

Session anomaly detection includes, but is not limited to examples in the following table.

| Characteristic | Example | Indication |
| --- | --- | --- |
| Device attributes for the same session identifier change | The operating system that is detected changes between or during measurements for the same session | Possible session hijack by an intercepting computer |
| Browser Agent ID is unknown | The Browser Agent strings for all popular web browsers have consistent identifying patterns. | An unknown browser may indicate a web spider ('robot') or other automated scanning device |
| The browser settings are unusual | The browser has flash, javascript, cookies and images turned off | The user is deliberately attempting to avoid detection. |
| The operating system indicated by the Browser ID is different from the operating system as measured by protocol profiling however there is no 'x_forwarded_for' tag. | The Browser Agent string may indicate that the client machine is a Windows device, however the operating system as determined by the implementation of the TCP stack indicates that the machine is a Linux based device. | There is an intermediate server between the client device and the website that is potentially trying to conceal its presence. |
| The IP Address measured via HTTP is different than that measured by HTTPS | The IP Address measured through an image pulled through an http connection is 210.5.64.3 and the IP Address measured through CGI parameters is 174.1.5.2 | There is an http proxy between the client and the website, most likely implemented by an ISP such as AOL. |
| The measured client IP Address is different from the presented IP Address and there is no 'http_via' flag. | A connection initiated from the client back to the measurement server that bypasses the proxy settings in the browser yields a different IP Address from that presented to the website. | There is an intermediate server between the client and the website. |

| Characteristic | Example | Indication |
| --- | --- | --- |
| Device attributes associated with a cookie are mismatched. | During visit at time A, a cookie is deposited that encodes a unique number with device attributes that were measured for that device during the visit i.e. OS = Windows. Later, during visit time B, the same cookie is detected however it is now being served by a computer with OS = Linux and a mismatch is detected based on the OS = Windows decoded from the cookie. | A hacker has stolen or copied a session cookie from one machine and attempted to access a website from another. |
| Insufficient Attributes | Only IP Address and Browser string is able to be obtained | Depending on the scenario this characteristic may reflect insufficient measurement time or because measurement has been deliberately blocked. |

Examples of additional classifications of the device include the following.

| Attribute | Description |
| --- | --- |
| Dynamic | The device IP Address is dynamically allocated by the ISP |
| Static | The device IP Address is statically allocated by the ISP |
| Unallocated ('Bogon') IP Address | A bogon is an informal name host/packet on the public Internet that claims to be from an area of the IP address space reserved, but not yet allocated or delegated by the Internet Assigned Numbers Authority (TANA) or a delegated Internet registry. The areas of unallocated address space are called "bogon space". |
| Hijacked IP Address | An address that is owned by someone but used by someone else without an authority. Hijacking typically takes place when control over publication of BGP information is achieved by a malicious party. |
| Open Relay | The connecting device allows SMTP traffic to be relayed through it, indicating that it is potentially compromised. |
| NAT | The device is behind a Network Address Translation device, typically a corporate firewall. |
| Geolocation | The location of the IP Address, such as country, region, city and latitude and longitude |
| True Geolocation | The location of the true IP Address of the client in the instance it is otherwise being hidden by an intermediate server. |
| Virtual Machine | The machine is running a virtualized server which may be masking the true device characteristics. |
| Botnet Zombie | The machine is believed to be infected with software that potentially compromises the integrity of the device. For example, the machine may be under the control of a Command and Control host or software the records keystrokes. |

According to embodiments of the invention, attributes and characteristics of a device have different qualities in terms of persistence, accuracy and coverage. For example, the clock uptime will change if a device is restarted. However, in combination, embodiments of the invention allow the persistent identification of a device despite user behavior that would otherwise incapacitate other identification methods. A key insight is that it is very hard to change a device's complete fingerprint without introducing significant cost and time into the process or alerting a user that the device may be compromised by a third party or signaling that the device is overtly attempting to avoid detection.

In order to prove the validity of matching strategies to generate a unique identifier a number of tests can be executed in some combination and be shown to generate the same unique ID.

Change the IP Address
Change the location of the device
Change the browser used
Change the local system time
Clear browser cookies
Use multiple computers behind the same IP Address
Connect through an intermediate server
Restart the device In determining an appropriate matching architecture and infrastructure for embodiments of the invention, careful consideration was made of the order of magnitude of volumes that would need to be required to provide a feasible commercial solution. A mid size online advertising network will deliver in the order of 20,000 advertisements per second. Assuming 1% conversion from advertisement to payment or other traceable action this advertising network would generate approximately 200 transactions per second. Of the day, the largest internet sites attract approximately 25 million visitors per day which equates to nearly 300 visitors per second and the largest online payments processors record approximately 4 million transactions per day during peak periods which equates to 50 transactions per second. In order to support current and future transaction loads, the device identifier itself is capable of representing in excess of $3.4*10^{38}$ separate devices, and the architecture designed to support transaction speeds sufficient to fingerprint every PC in the US in 24 hours within a commercially reasonable cost budget.

In preference, the invention provides techniques that are able to be deployed on a single server solution for remote deployment, or deployed on multiple servers and then expanded by adding servers. Traditionally, a transactional system is bounded by the updates per second which in turn is degraded over time as the seek time increases with number of records held. An advantage of the present invention is that transaction performance is largely independent of the total number of device identifiers and attributes stored. Total processing costs scale linearly with fingerprints generated/matched per second through intelligent partitioning and rule matching, described later, and the use of a communications and development framework that allows developers to build code without having to be concerned with the physical location of the resultant execution of the code, whether it be on the same server or across the globe. This attribute of the invention means that complex issues such as security, uptime, failover, quality of service and redundancy are abstracted away from the execution of the code. Google's MapReduce was developed to overcome a similar problem of scale allowing employees to develop simple but powerful functional, rather than procedural, code that could be deployed across large numbers of servers. A key difference between MapReduce and the present invention is that MapReduce was optimized for algorithmic operations such as SORT, RANK, COUNT on web-scale data sets that are relatively stable, whereas the present architecture discussed in the paper is optimized for a transactional pipeline process where data must be searched, matched and updated during a transaction, and rule matching may change over time.

FIG. 4 is a diagram view of the framework which illustrates the flexibility and power of the architecture to grow to accommodate additional transaction speeds and storage requirements in a manner that is scaleable and fault tolerant. In this example, a client process 401 wishes to access (get) a specific set of attributes based on a device ID. The client makes a request to a Command Broker 410 using a Command Object 420. 410 is responsible for managing the communication of 420 between processes (nodes) on the network. 420 has a Command Type, a Command Version, a unique identifier generated for that specific command, a Quality of Service definition such as response time, and a Property Bucket which is a proprietary and extensible method for passing multiple parameters of different types. 420 references a Global Service Definition 430 that maps which Command Executors 450 are available in the network and which Command Types are supported by each Command Executor based on its Command Executor Type. 430 may be implemented in several ways, one such method being a file accessible and resident with each process on the network, another such method being a global web-service which is queried by 410. The Node Definition service/file 440 tells 420 which Command Executors are available on the local machine. For ease of maintenance, all services are deployed as a single software build on the same machine. Those skilled in the art would appreciate that this means that Command Executors can be activated and deactivated for dynamic load balancing requirements based on the instructions of 440 without having to change deployed software. In one example, 410 determines that no Command Executors on the same machine are available to return the attributes required, and uses a Connector 460 to communicate with a remote Command Broker 470 which in turn forwards the command to a Command Executor registered with 430 that it is able execute the Command Type. To those skilled in the art it will be apparent that a consequence of using the above framework is that scaleable parallel processing and redundancy is easily achieved through the judicious specification of services using 430 and 440. Further it is also apparent that for any given combination of processes and machines on a network that task and command execution can be dynamically routed allowing the most efficient use of resources. When applied to the domain of rule matching for the purposes of generating a unique device identifier it can be seen that additional servers and Command Executors can be deployed without concern to a client process.

In preference a match is based on a match strategy and one or more rules. Rules may be based on equality, threshold or statistical approaches, and may be derived by expert knowledge or based on historical data and machine learning methods where one example of a machine learning method would be via Support Vector Machines (SVM) where SVM provides for computationally efficient multi-attribute weighting and feature classification. Data storage for a single matching function or "rule" is located on one or more servers. The server on which the data is physically stored is determined by a data partitioning function. This same partitioning function can be used to determine which server should be then queried for any subsequent matching.

Figure 6:
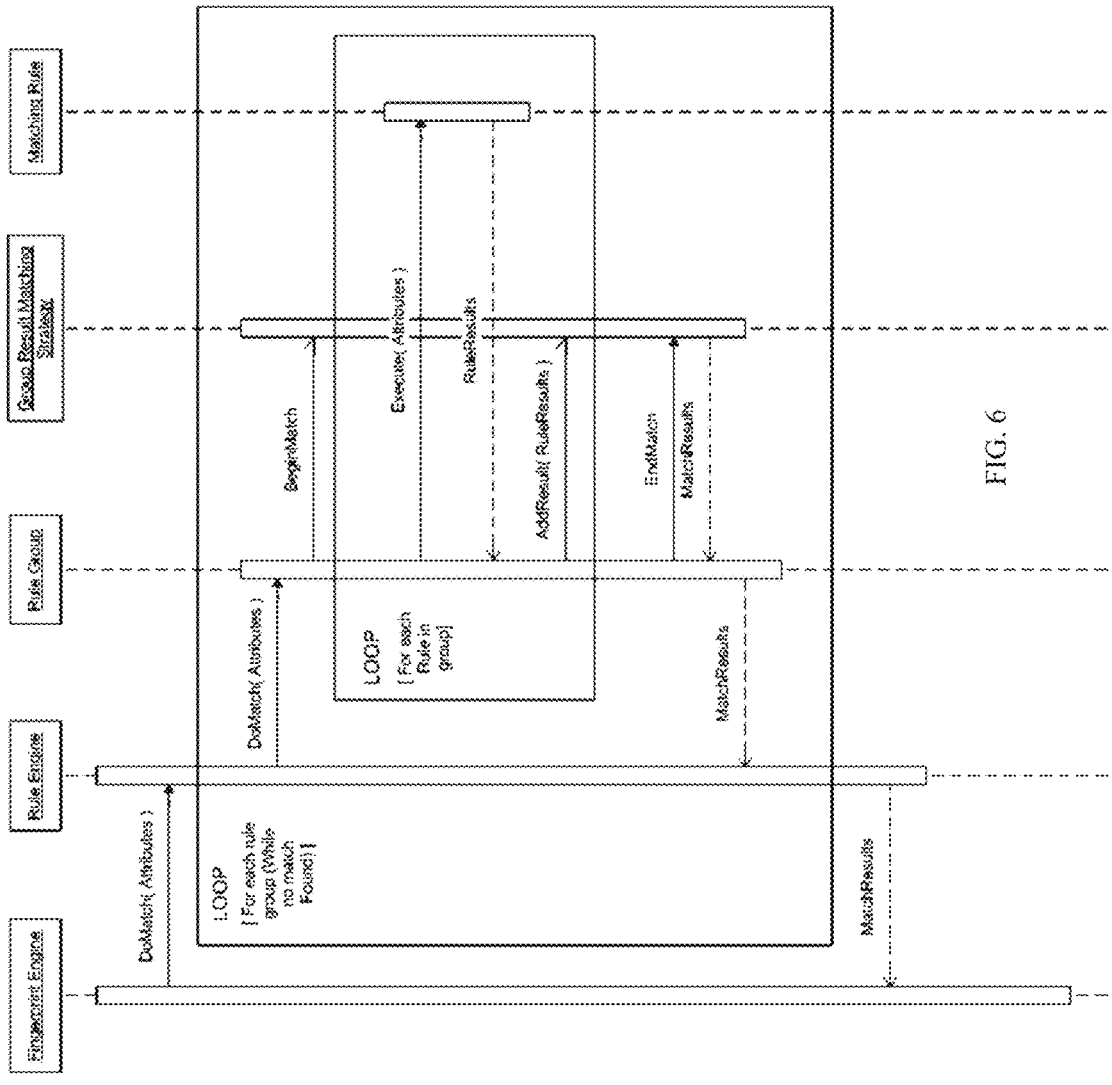
FIG. 6 is a simplified view diagram illustrating a method for grouping rules and evaluating the results of rules within a group according to an embodiment of the present invention.

In preference a rule engine is used which consists of matching strategy consists of matching groups consists of matching rules. FIG. 6 is a simplified view diagram illustrating a method for grouping rules and evaluating the results of rules within a group according to an embodiment of the present invention. This diagram is merely an example, which should not unduly limit the scope of the claims herein. One of ordinary skill in the art would recognize other variations, modifications, and alternatives.

A matching rule consists of one or more attribute and a validity period, and contains a matching priority and or weighting and is related to one or more rule groups with one or more matching strategies, where one feature of a matching strategy is the option to exit out of matching logic once a certain threshold was reached without requiring redundant matching, and where another feature of a matching strategy is the option of executing multiple matching rules in sequence and or in parallel. The output of a matching rule being one or more machine identifiers and score where one example of group matching strategy would be "execute all rules in rule group A in parallel and return all device identifiers with a rule score exceeding a threshold of 50" and one example of a rule logic would be "device identifier score equals (=) V where the value of the hash of its attributes W and X equals (=) Y based on all attribute values stored for this rule within timeframe Z".

Figure 5:
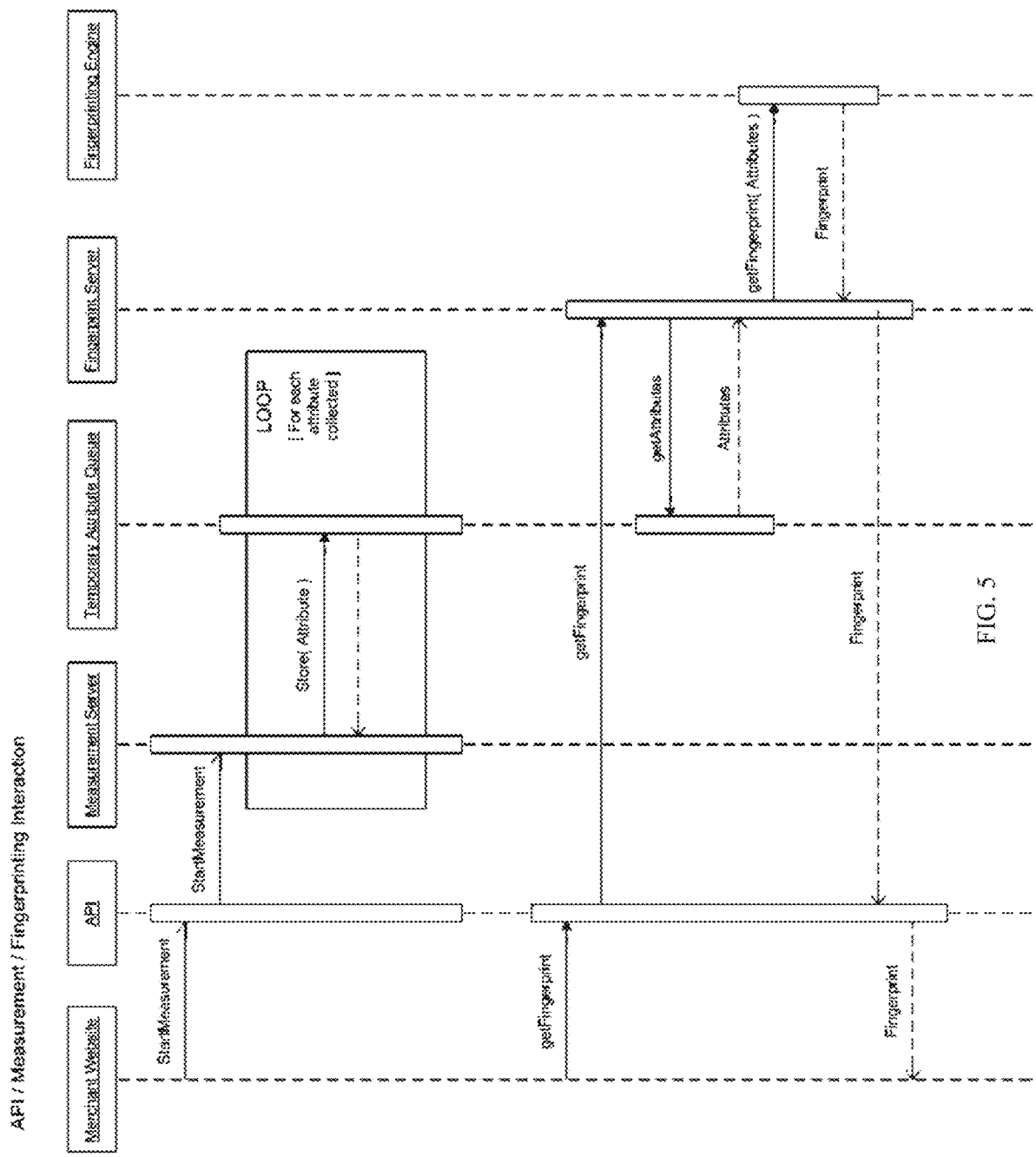
FIG. 5 is a simplified view diagram illustrating a scaleable and fault tolerant framework for flexible task execution across multiple processes and machines.

FIG. 5 is a simplified view diagram illustrating a matching logic flow according to an embodiment of the present invention. This diagram is merely an example, which should not unduly limit the scope of the claims herein. One of ordinary skill in the art would recognize other variations, modifications, and alternatives.

In preference the architecture is asynchronous and event driven. Events can be managed by a thread pool removing one to one relationship between a thread and execution of a task. Code may be executed on the same machine or remotely. Rules matches can be performed in parallel across multiple machines.

In preference rules may have one or more machine boundaries allowing the scalable match criteria/rules, meaning the major bottleneck of performance being moved from individual processor capacity to network bandwidth and traffic capacity. In preference a rule server is part of a distributed device identifier or 'fingerprint' repository and is responsible for storing and searching the attribute set used by a single rule on a per rule basis.

In preference a matching function has a partitioning function, meaning high volume match rules can be seamlessly split/partitioned across multiple machines to achieve higher throughput rates, meaning reducing the number of items that need to be matched. An example of a partitioning function would be to split an index across a number of servers, with each server storing all indices starting with a unique value. Assuming a partitioning function that provides even distribution of data, the throughput can increase linearly so long as the network infrastructure allows.

Figure 7:
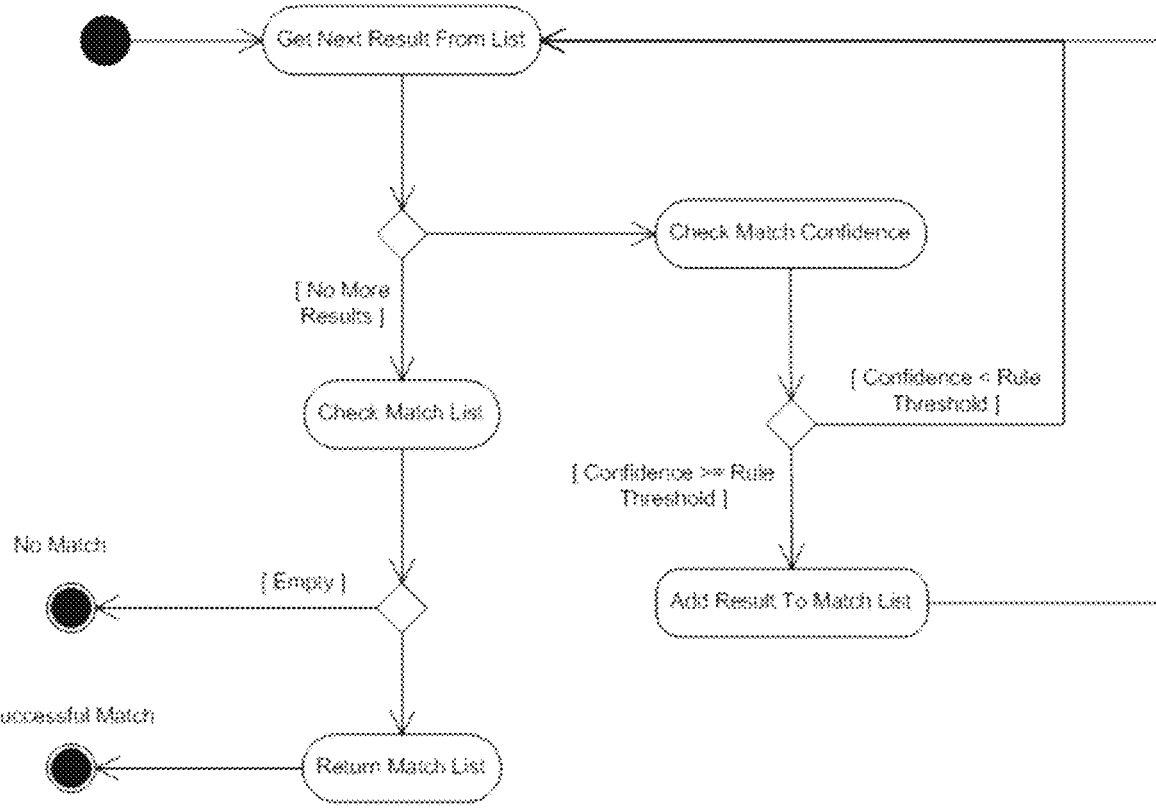
FIG. 7 is a simplified view diagram illustrating a matching logic flow according to an embodiment of the present invention.
Figure 8:
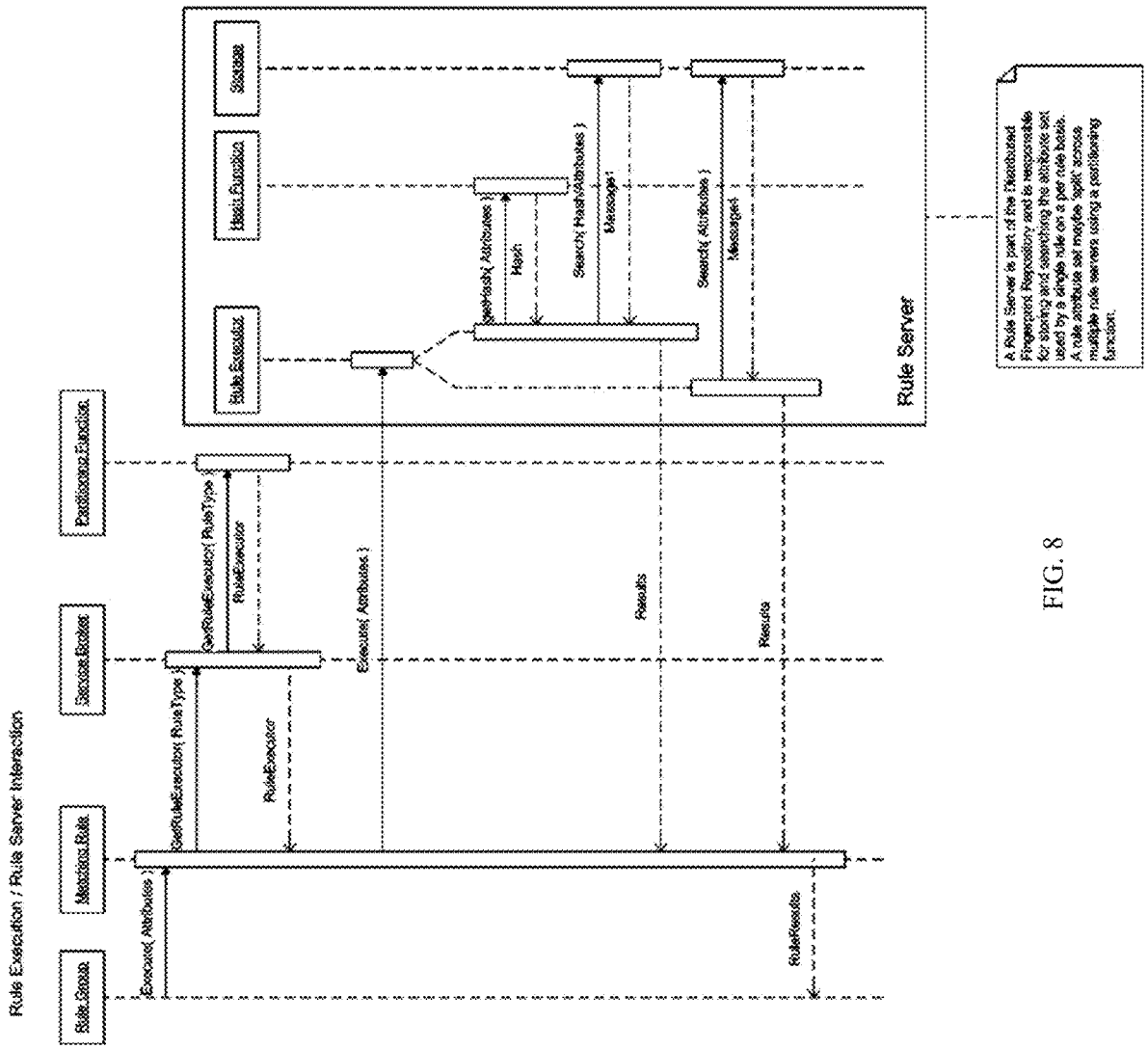
FIG. 8 is a simplified view diagram illustrating a method for executing a rule across machine boundaries according to an embodiment of the present invention.

FIG. 7 is a simplified view diagram illustrating a method for executing a rule across machine boundaries according to an embodiment of the present invention. This diagram is merely an example, which should not unduly limit the scope of the claims herein. One of ordinary skill in the art would recognize other variations, modifications, and alternatives.

In preference only a single identifier is returned from any number of matching strategies although multiple values are permissible based on the matching criteria. In preference, if a match is obtained, and yet one or more attributes values differ or additional attributes have been measured not currently associated with the device identifier then these new attributes and values will replace older values. This characteristic ensures that the device attributes evolve over time while keeping the device identifier persistent.

In preference once an identifier has been obtained, this identifier can be linked to a reputation engine to store and collate reputation information where one example is the recording of a transaction time and whether it was successful or not. This reputation may be returned as part of an API provided to a customer website assuming a unique session identifier or device identifier is provided. Global anomaly checks are performed based on the observation of device identifiers, reputation and attributes over time, where an example includes calculating a repeat visit velocity threshold for a specific website or globally for a given device identifier.

Figure 9:
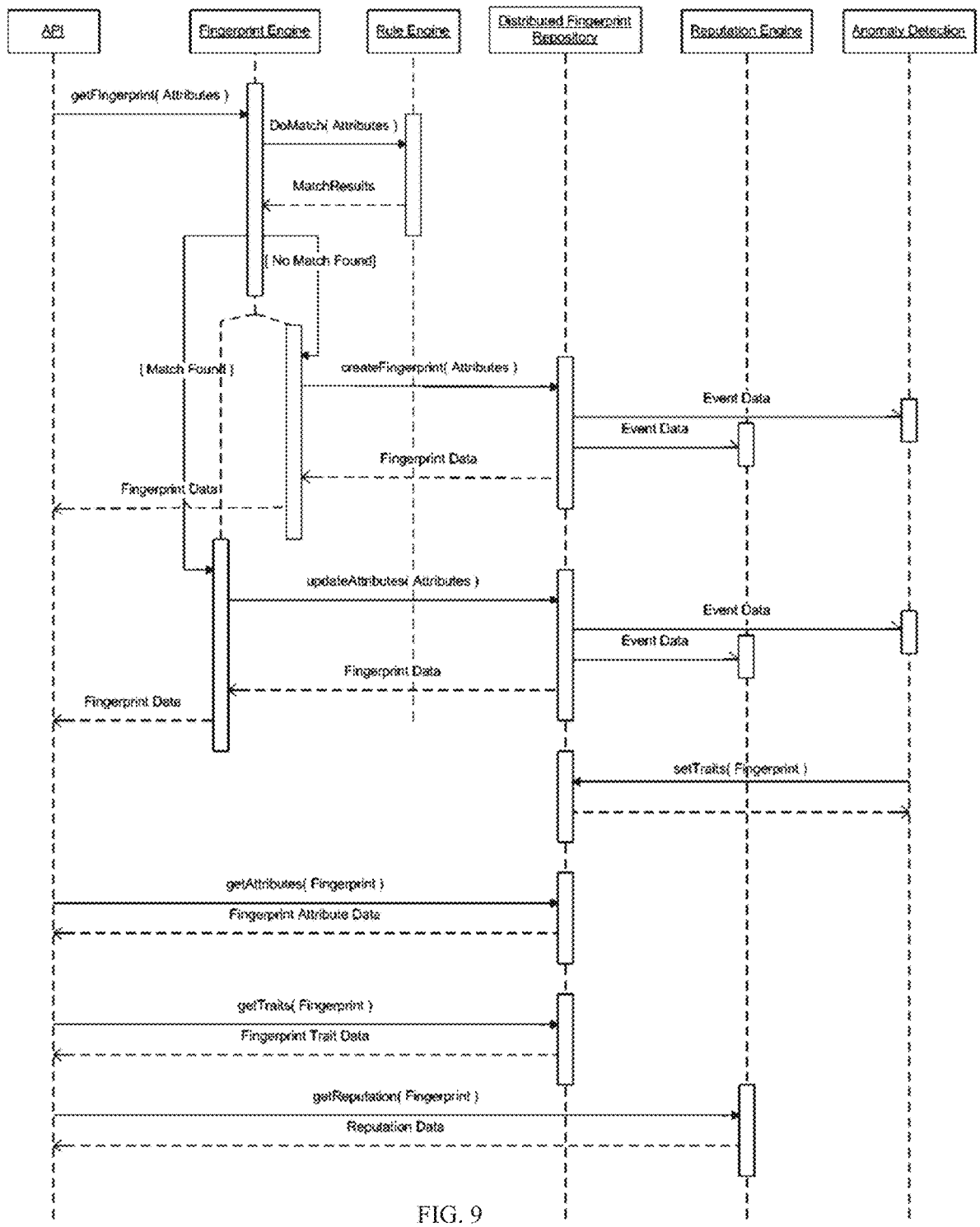
FIG. 9 is a simplified view diagram illustrating interactions between the fingerprinting engine and reputation and anomaly detection engine according to an embodiment of the present invention.

FIG. 9 is a simplified view diagram illustrating interactions between the fingerprinting engine and reputation and anomaly detection engine according to an embodiment of the present invention. This diagram is merely an example, which should not unduly limit the scope of the claims herein. One of ordinary skill in the art would recognize other variations, modifications, and alternatives.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A system comprising:
a measurement server in communication with a web server hosting a webpage, the measurement server configured to:
capture a plurality of attributes from a network device connecting to the web server responsive to the network device loading the webpage, and without requiring attribute capturing software to reside on the network device, wherein at least one of the captured plurality of attributes comprises an indication of a masking of a characteristic of the network device; and
assign a classification to the network device according to the plurality of attributes;
a matching server in communication with the measurement server, the matching server configured to:
receive the plurality of captured attributes from the measurement server;
generate a network device identifier for the network device based the captured plurality of attributes associated with the network device;
determine a reputation of the network device based on one or more of the assigned classification and a comparison of the network device identifier with an existing device identifier; and
share the determined reputation of the network device.

2. The system of claim 1, wherein the matching server is further configured to assign a unique identifier to the network device to uniquely distinguish the network device from a plurality of other networks devices.

3. The system of claim 2, further comprising a global identifier server in communication with the measurement server, the global identifier server configured to store the unique identifier based on the reputation.

4. The system of claim 1, further comprising an attribute storage server in communication with the measurement server, wherein the attribute server is configured to:
store the plurality of captured attributes; and
prevent storage of incorrect or falsified attributes based on the determined reputation.

5. The system of claim 1, wherein the matching server is configured to distinguish a compromised client device from a masquerading device.

6. The system of claim 1, further comprising an API server in communication with the web server, the API server configured to perform one or more of: verifying requests, processing requests, and requesting accounting.

7. The system of claim 1, wherein the measurement server captures the plurality of attributes via web code inserts in the webpage.

8. The system of claim 1, wherein the measurement server is hosed on a same domain as the web page.

9. The system of claim 1, wherein the measurement server is hosted by an external data center.

10. The system of claim 1, wherein the measurement server is further configured to measure and classifying the plurality of attributes associated with the network device.

11. The system of claim 1, wherein the measurement server is configured to classify the network device according to whether the network device:
is connecting through an intermediate server'
has been hijacked;
has a profile inconsistent with a normal internet browser;
demonstrates anomalous on-site behavior;
has a profile that is consistent with that of a machine attempting to evade identification or detection;
is potentially infected; and
is attempting an action that may be construed as an attack on the web server.

12. A computer-implemented method comprising:
capturing, with a measurement server, a plurality of attributes from a network device connecting to the web server responsive to the network device loading the webpage, and without requiring attribute capturing software to reside on the network device, wherein at least one of the captured plurality of attributes comprises an indication of a masking of a characteristic of the network device;
assigning a classification to the network device according to the plurality of attributes;
generating a network device identifier for the network device based the captured plurality of attributes associated with the network device;
determining a reputation of the network device based on one or more of the assigned classification and a comparison of the network device identifier with an existing device identifier; and
sharing the determined reputation of the network device.

13. The method of claim 12, further comprising assigning a unique identifier to the network device to uniquely distinguish the network device from a plurality of other networks devices.

14. The method of claim 12, further comprising preventing storage of incorrect or falsified attributes based on the determined reputation.

15. The method of claim 12, wherein the reputation to distinguishes a compromised device from a masquerading device.

16. The method of claim 12, wherein the plurality of attributes are captured via web code inserts in the webpage.

17. The method of claim 12, wherein the measurement server is hosed on a same domain as the web page.

18. The system of claim 1, wherein the measurement server is hosted by an external data center.

19. A method comprising:
classifying a plurality of attributes associated with a network device connecting to the web service, the plurality of attributes uniquely identifying the network device from a plurality of other networks devices, wherein at least one of the plurality of attributes comprises an indication of a masking of a characteristic of the network device;
generating a unique identifier for the network device based on a programmatic transformation of the measured plurality of attributes associated with the network device;
comparing the unique identifier against one or more existing unique stored identifiers;
determining a reputation of the network device based on one or more of the classifying and comparing; and
sharing the determined reputation of the network device.

20. The method of claim 19, further comprising one or more of: storing the plurality of captured attributes; and preventing storage of incorrect or falsified attributes based on the determined reputation.

* * * * *